(12) United States Patent
Kelly et al.

(10) Patent No.: US 11,529,024 B2
(45) Date of Patent: Dec. 20, 2022

(54) PORTABLE SOLAR SHOWER WITH VACUUM INSULATED WATER TANK

(71) Applicant: Outdoor Culture Inc., Rancho Santa Fe, CA (US)

(72) Inventors: Phillip Earl Kelly, Rancho Santa Fe, CA (US); Christopher Jackson Crawford, Carlsbad, CA (US)

(*) Notice: Subject to any disclaimer, the term of this patent is extended or adjusted under 35 U.S.C. 154(b) by 141 days.

(21) Appl. No.: 17/162,332

(22) Filed: Jan. 29, 2021

(65) Prior Publication Data

US 2021/0235941 A1  Aug. 5, 2021

Related U.S. Application Data

(60) Provisional application No. 62/968,769, filed on Jan. 31, 2020.

(51) Int. Cl.
*A47K 3/32* (2006.01)
*F24S 20/00* (2018.01)
(Continued)

(52) U.S. Cl.
CPC .............. *A47K 3/325* (2013.01); *A47K 3/281* (2013.01); *A47K 3/285* (2013.01); *B60R 15/02* (2013.01);
(Continued)

(58) Field of Classification Search
CPC .. F24H 1/06; F24H 1/182; Y02E 10/40; F24S 10/70; F24S 10/72; F24S 10/73;
(Continued)

(56) References Cited

U.S. PATENT DOCUMENTS

| 3,595,216 A * | 7/1971 | Lanciault | F24S 30/20 126/606 |
| 4,196,718 A * | 4/1980 | Neustein | F24D 11/005 126/614 |

(Continued)

FOREIGN PATENT DOCUMENTS

| FR | 2420098 A1 * | 3/1978 | ............... A47K 3/28 |
| GB | 2486263 A * | 6/2012 | ............... E03B 3/02 |

(Continued)

*Primary Examiner* — Edelmira Bosques
*Assistant Examiner* — Benjamin Trettel
(74) *Attorney, Agent, or Firm* — Eric Hanscom

(57) ABSTRACT

A portable solar shower is a showering device that can heat the water in a tank to a user defined temperature, with the help of a large solar panel. In order to accomplish that, the device includes a thermostat that displays multiple temperatures, a vacuum insulated water tank that helps maintain the temperature of the water at the user defined temperature level for long hours, and a retractable showerhead and shower pipe. Further, the device is mounted over an upper surface of a vehicle, thereby not compromising any luggage or trunk space of the vehicle. The portable solar shower further includes a power unit that provides power to water pumps and all the necessary circuitry within the device. Furthermore, the device includes an additional smaller solar panel that can provide energy to the power unit, thereby enabling the user to run the shower unit on natural renewable sources of energy.

17 Claims, 12 Drawing Sheets

(51) Int. Cl.
  *F24H 1/18* (2022.01)
  *F24H 1/06* (2022.01)
  *A47K 3/28* (2006.01)
  *B60R 15/02* (2006.01)
  *F24S 10/70* (2018.01)

(52) U.S. Cl.
  CPC ............... *F24H 1/06* (2013.01); *F24H 1/182* (2013.01); *F24S 20/04* (2018.05); *F24S 10/748* (2018.05)

(58) Field of Classification Search
  CPC ........ F24S 10/74; F24S 10/742; F24S 10/744; F24S 10/746; F24S 10/748; F24S 20/04; F24S 20/00; B60R 15/02; A47K 3/28; A47K 3/285; A47K 3/325
  See application file for complete search history.

(56) References Cited

U.S. PATENT DOCUMENTS

| | | | | |
|---|---|---|---|---|
| 4,306,544 A | * | 12/1981 | Clemens | F24S 80/50 126/684 |
| 5,961,048 A | * | 10/1999 | Prieschl | B05B 9/007 239/128 |
| 8,225,436 B1 | * | 7/2012 | Cotton | B60R 9/048 4/597 |
| 2011/0181018 A1 | * | 7/2011 | Bruneau | F24S 25/61 136/251 |
| 2012/0096781 A1 | * | 4/2012 | Romesburg | E04D 3/358 52/173.3 |
| 2012/0260417 A1 | * | 10/2012 | LeBlanc | C02F 1/004 4/612 |
| 2014/0289956 A1 | * | 10/2014 | Murden | B60R 15/02 4/603 |
| 2015/0060467 A1 | * | 3/2015 | Cotton | B60R 9/048 220/562 |
| 2015/0292772 A1 | * | 10/2015 | Murphy | F28D 20/0034 126/714 |
| 2017/0153042 A1 | * | 6/2017 | Plowman | F24H 1/06 |
| 2019/0017727 A1 | * | 1/2019 | Rawls | F24H 1/08 |
| 2019/0092248 A1 | * | 3/2019 | Cotton | B60R 15/02 |
| 2021/0108401 A1 | * | 4/2021 | Carter | E03D 5/01 |

FOREIGN PATENT DOCUMENTS

| | | | | |
|---|---|---|---|---|
| GB | 2509689 A | * | 7/2014 | ........... A01K 13/001 |
| GB | 2545399 A | * | 6/2017 | ............... A47K 3/28 |
| JP | 63143448 U | * | 9/1988 | ........... A01K 13/001 |

* cited by examiner

PORTABLE SOLAR SHOWER WITH VACUUM INSULATED WATER TANK

The current application claims a priority to the U.S. Provisional Patent application Ser. No. 62/968,769 filed on Jan. 31, 2020.

FIELD OF THE INVENTION

The present invention relates generally to a portable car shower that comprises a vacuum insulated water tank. More specifically, the present invention is a shower for the road that is primarily powered by solar power and helps maintain the temperature of the water at a set comfortable level.

BACKGROUND OF THE INVENTION

Road trips and camping trips are always looked forward to by travel enthusiasts, nature lovers, outdoor adventurers etc. However, accessibility to water and/or clean restrooms often becomes a challenge in such trips. Having instant and easy access to pressurized water wherever you go is always appreciated and an added advantage to such trips. There are many portable road/car showers available in the market. Many such car showers utilize the battery of the vehicle for their working. However, a portable shower unit that can be mounted over a vehicle, and which can provide warm water at a user specified temperature level for long hours using solar energy is a rare find in the current market.

An objective of the present invention is to provide users with a portable shower unit that can heat the water in a tank to a user defined temperature, with the help of a large solar panel. According to the present invention, the shower unit may be mounted over an upper surface of a vehicle, thereby not compromising any luggage or trunk space of the vehicle. Further, the present invention comprises a thermostat that displays the outside temperature and the temperature of the water, and a vacuum insulated water tank, that helps maintain the temperature of the water at the user defined temperature for long hours. The present invention further comprises a power unit that provides power to the water pumps and all other necessary circuitry within the shower unit. Furthermore, the present invention comprises an additional smaller solar panel that can provide energy to the power unit, thereby enabling the user to run the shower unit on natural renewable sources of energy.

DETAIL DESCRIPTIONS OF THE INVENTION

Figure 1:
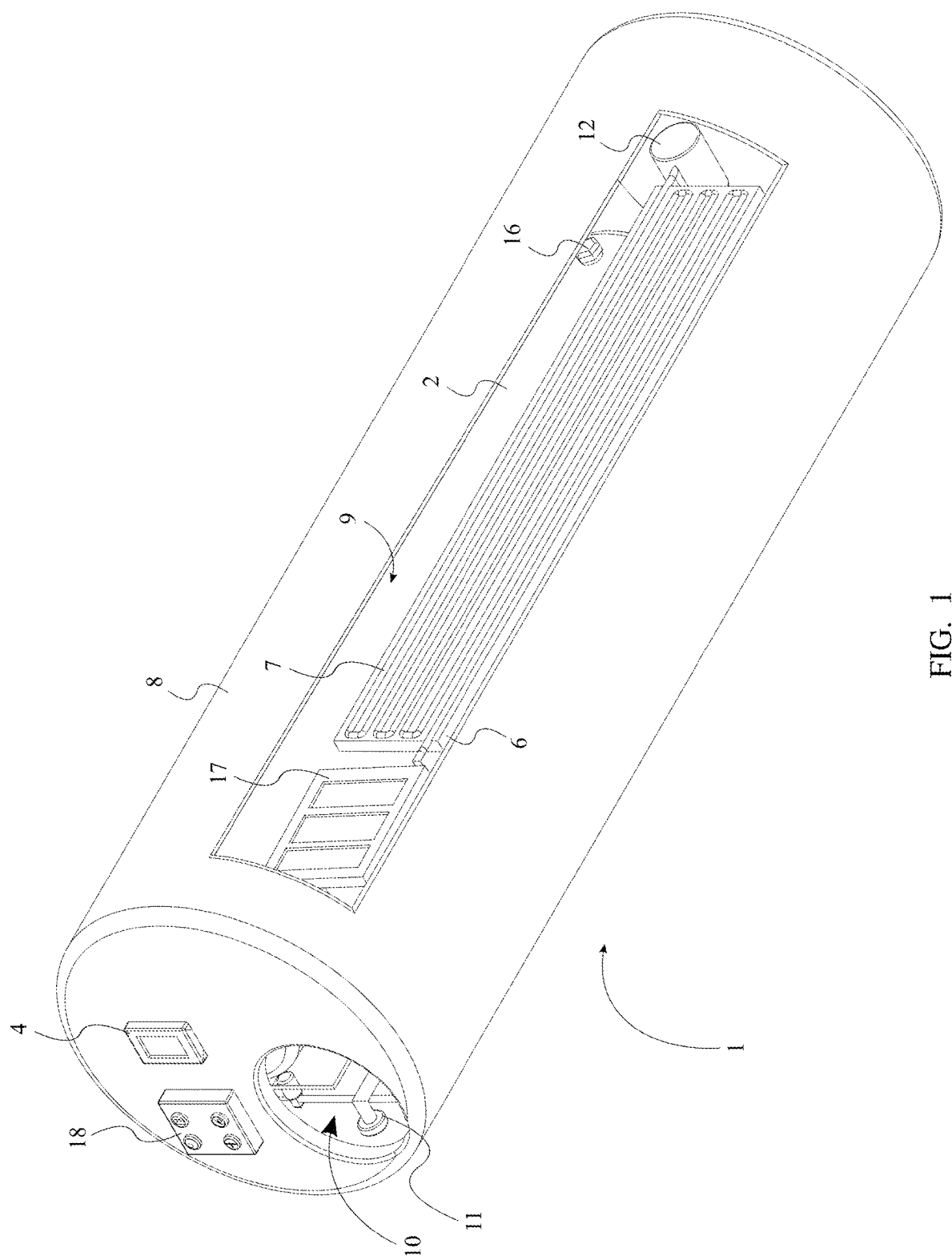
FIG. 1 is a top-front-left perspective view of the present invention.
Figure 2:
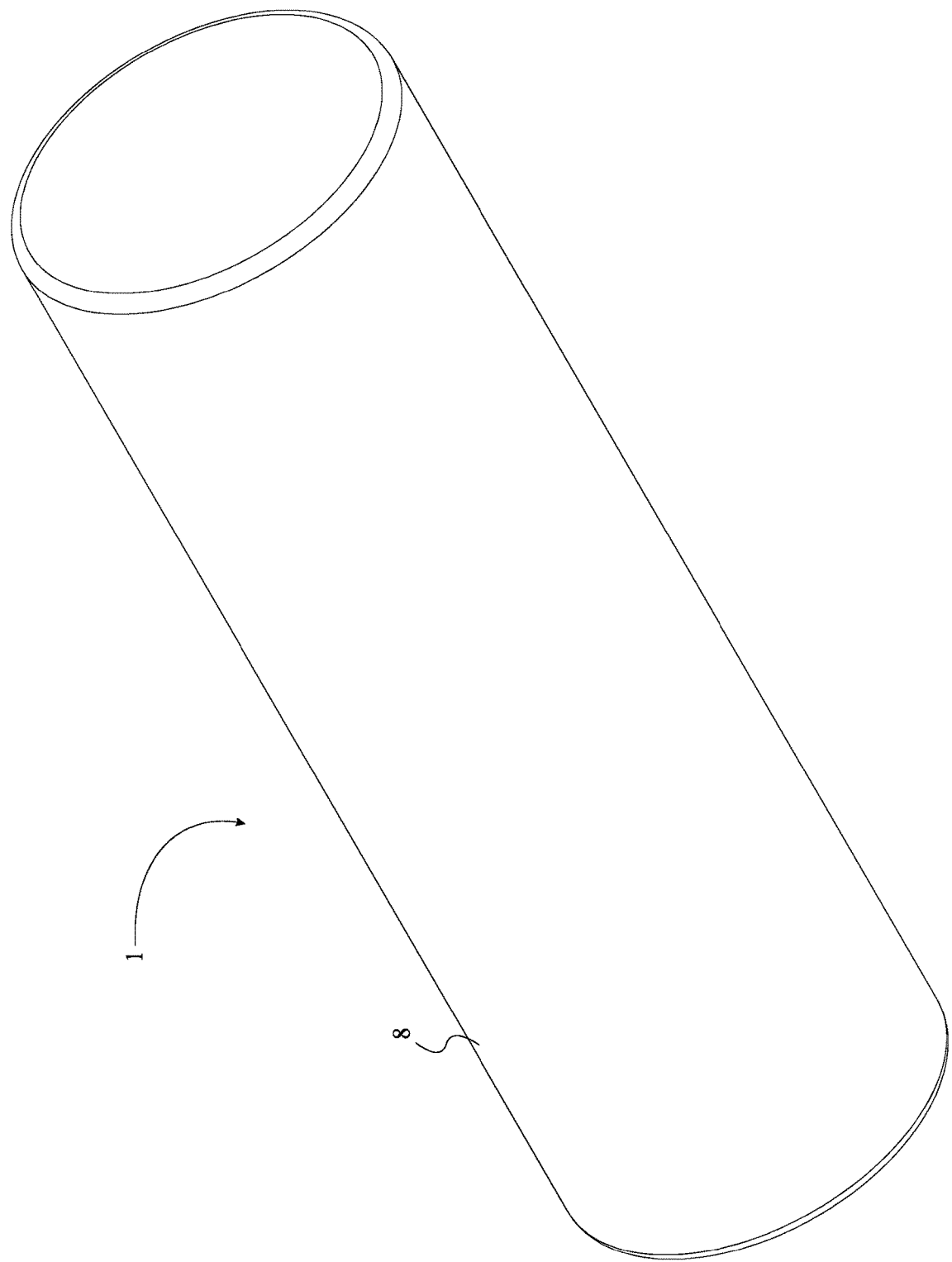
FIG. 2 is a bottom-rear-right perspective view of the present invention.

All illustrations of the drawings are for the purpose of describing selected versions of the present invention and are not intended to limit the scope of the present invention.

In reference to FIG. 1 through FIG. 12, the present invention is a portable solar shower. An objective of the portable solar shower is to provide users with a portable showering unit that can heat the water in a tank (within the showering unit) to a user defined temperature, with the help of a large solar panel. According to the portable solar shower, the showering unit may be mounted over an upper surface of a car or a vehicle, thereby not compromising any luggage or trunk space of the vehicle. Further, the portable solar shower comprises a thermostat that displays the outside temperature as well as the temperature of the water, and a vacuum insulated water tank that helps maintain the temperature of the water at the user defined temperature level for longer hours. The portable solar shower further comprises a power unit that provides power to water pumps and all the necessary circuitry within the shower unit. Furthermore, the portable solar shower comprises an additional smaller solar panel that can provide energy to the power unit, thereby enabling the user to run the shower unit on natural renewable sources of energy.

The following description is in reference to FIG. 1 through FIG. 12. As seen in FIG. 1 through FIG. 12, the portable solar shower comprises an enclosure 1, a water tank 2, a shower system 3, a thermostat 4, a first pump 5, at least one first solar panel 6, and a water circulating tube 7. According to a preferred embodiment of the present invention, the enclosure 1 comprises an outer shell 8, a first opening 9 and a second opening 10. Preferably, the outer shell 8 is a powder coated metal covering, that encloses majority of the components of the invention. Further, the outer shell 8 comprises a slight texture to the outer surface area to disrupt airflow. Disrupting the airflow leads to releasing the vacuum created on the back of the outer shell 8, thereby eliminating noise. In other words, the texture on the outer surface of the outer shell 8 is intended to make the structure of the portable solar shower less noisy when the vehicle is traveling at high speed. Furthermore, the outer shell 8 provides an aerodynamic design and a weatherproof housing for the present invention. However, the outer shell 8 may comprise any shape and/or material, as long as the intended purpose of the present invention is not hindered. Additionally, the enclosure 1 comprises one or more openings to expose the solar panels and/or access one or more components within the portable solar shower. To that end, the first opening 9 normally traverses into the outer shell 8 and the second opening 10 laterally traverses into the outer shell 8. According to the preferred embodiment, the water tank 2, the shower system 3, the first pump 5 and the at least one solar panel 6 are mounted within the outer shell 8.

It is an aim of the present invention to provide users with pressurized water, that is set at a user defined temperature level through the portable shower. To that end, the portable solar shower comprises the water tank 2 for holding water. Preferably, the water tank 2 is insulated which keeps water at the set temperature for long duration (6-8 hours). Further, the water tank 2 is a cylindrically shaped, vacuum insulated water tank. However, the water tank 2 may comprise any shape, size, material, features, type or kind, orientation, components, and arrangements of components that would allow the present invention to fulfill the objectives and intents of the present invention.

According to the preferred embodiment, the shower system 3 enables a user to access pressurized water from the water tank 2 through a shower. Accordingly, the shower system 3 comprises a shower head 11, a second pump 12 and a shower pipe 13. According to the preferred embodiment, the second pump 12 is operably coupled to the water tank 2, wherein the second pump 12 induces a pressure differential that draws water from the water tank 2 into the shower head 11. In other words, the second pump 12 draws water from the water tank 2 and pumps pressurized water through nozzles 11a in the shower head 11. Preferably, the second pump 12 is a 12V diaphragm water pump. The shower head 11 further comprises an ergonomic, actuating button 14 (trigger), which actuates the flow of the pressurized water through the shower head 11. Further, the second pump 12 may comprise one-way air bleeder valve (not shown) to prevent water pump from creating a vacuum inside the water tank 2 as the water is pumped out. It should be noted that the second pump 12, the shower head 11 and the shower pipe 13 may comprise any size, shape, brand or size, that is known to one of ordinary skill in the art, as long as the intended purpose of the present invention is not altered. An example of such a shower pipe 13 includes a coiled hose, and an example of such a shower head 11 includes a sprayer with one or more spray settings.

Figure 3:
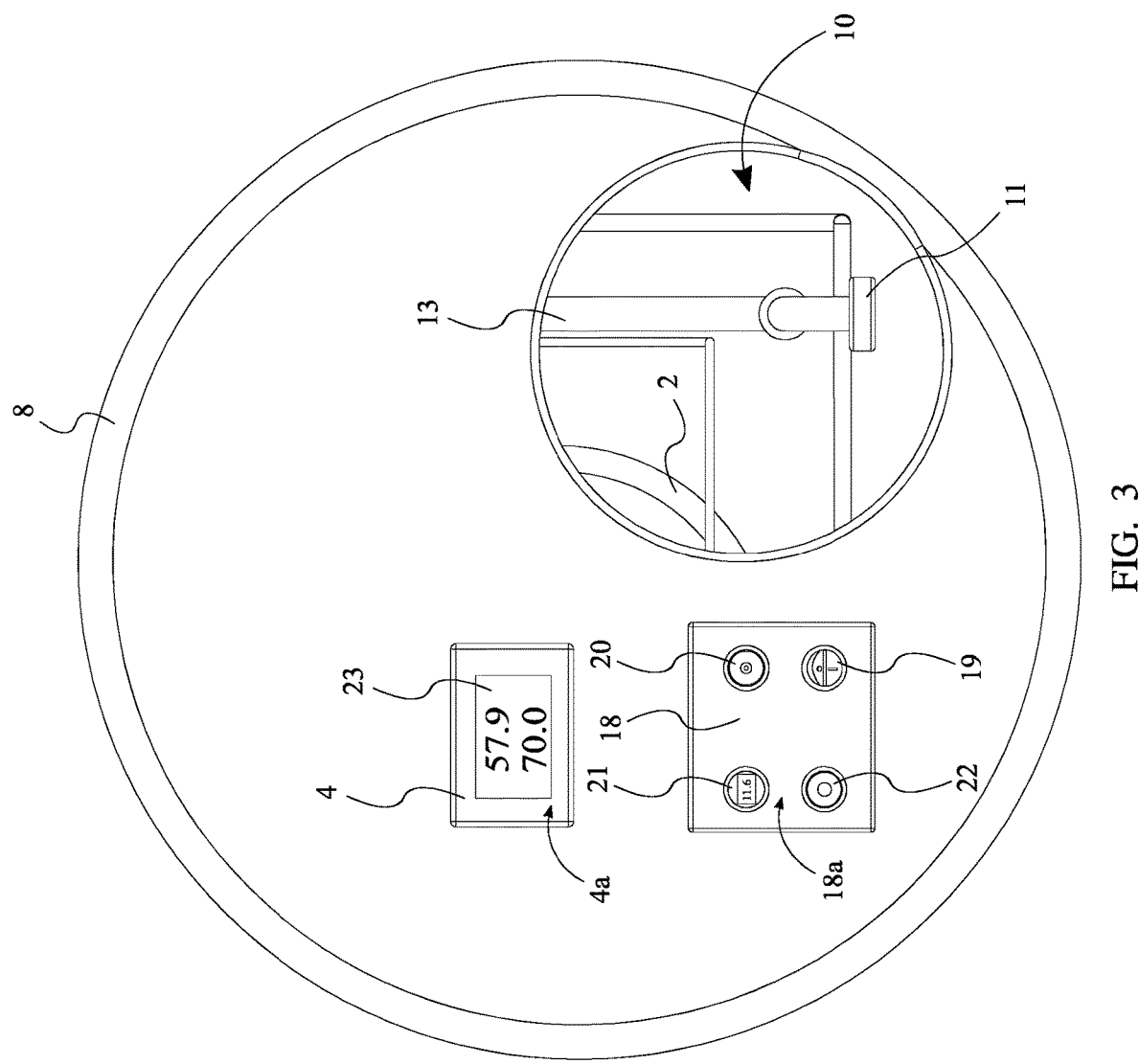
FIG. 3 is a left perspective view of the present invention.
Figure 4:
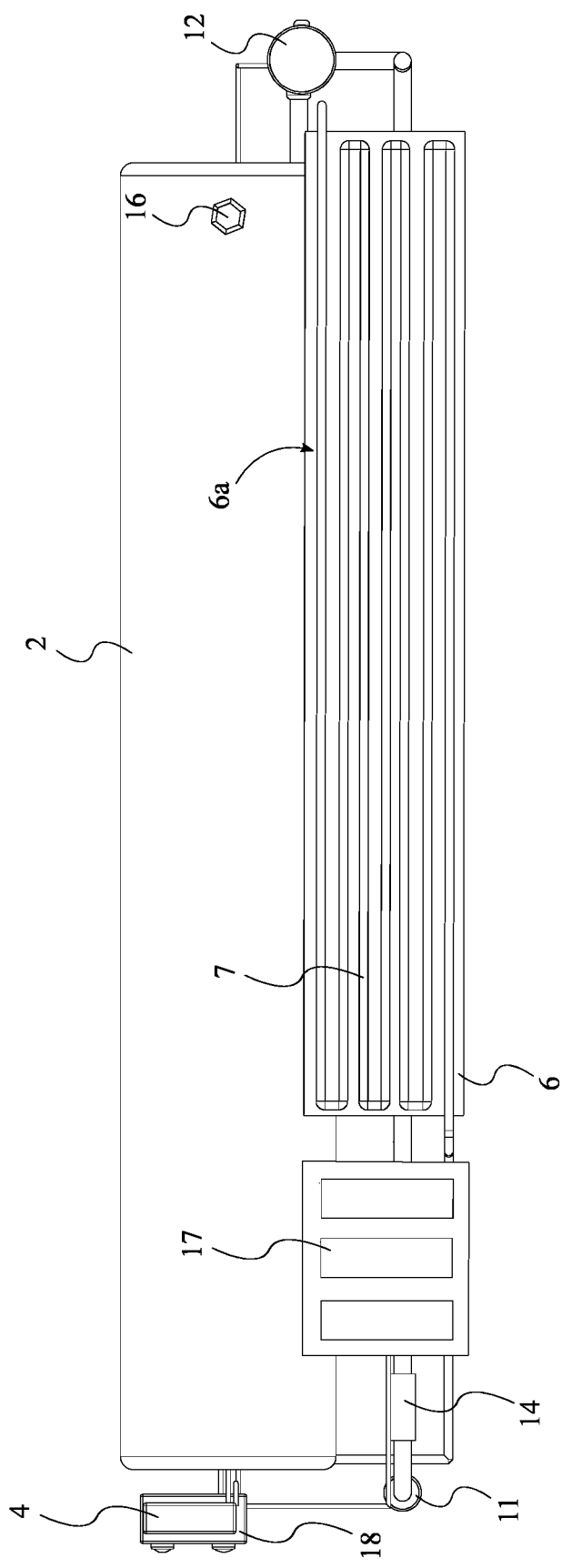
FIG. 4 is a top-plan view of the present invention, without an outer casing.
Figure 7:
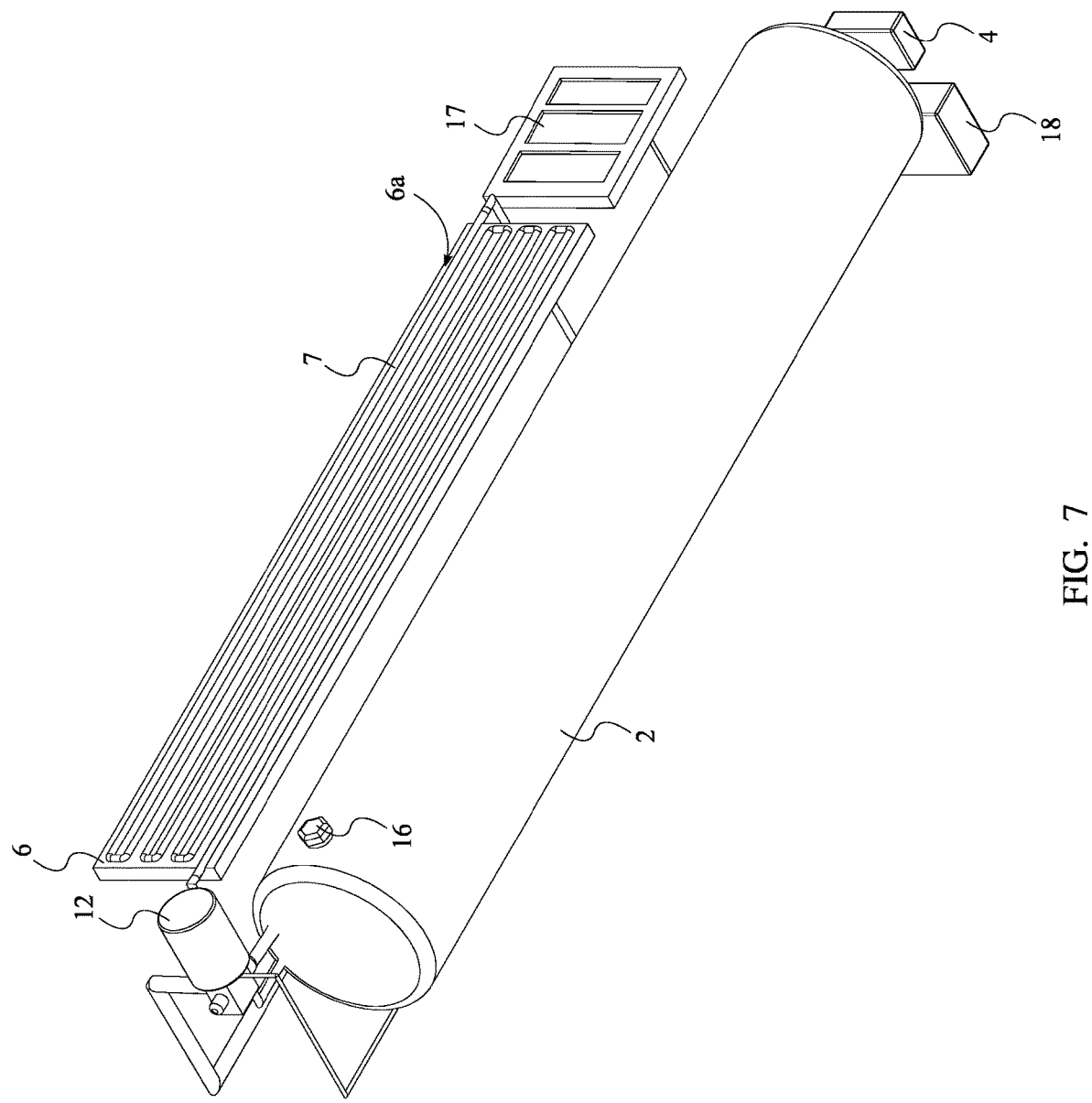
FIG. 7 is a top-rear-right perspective view of the present invention, without the outer casing.
Figure 8:
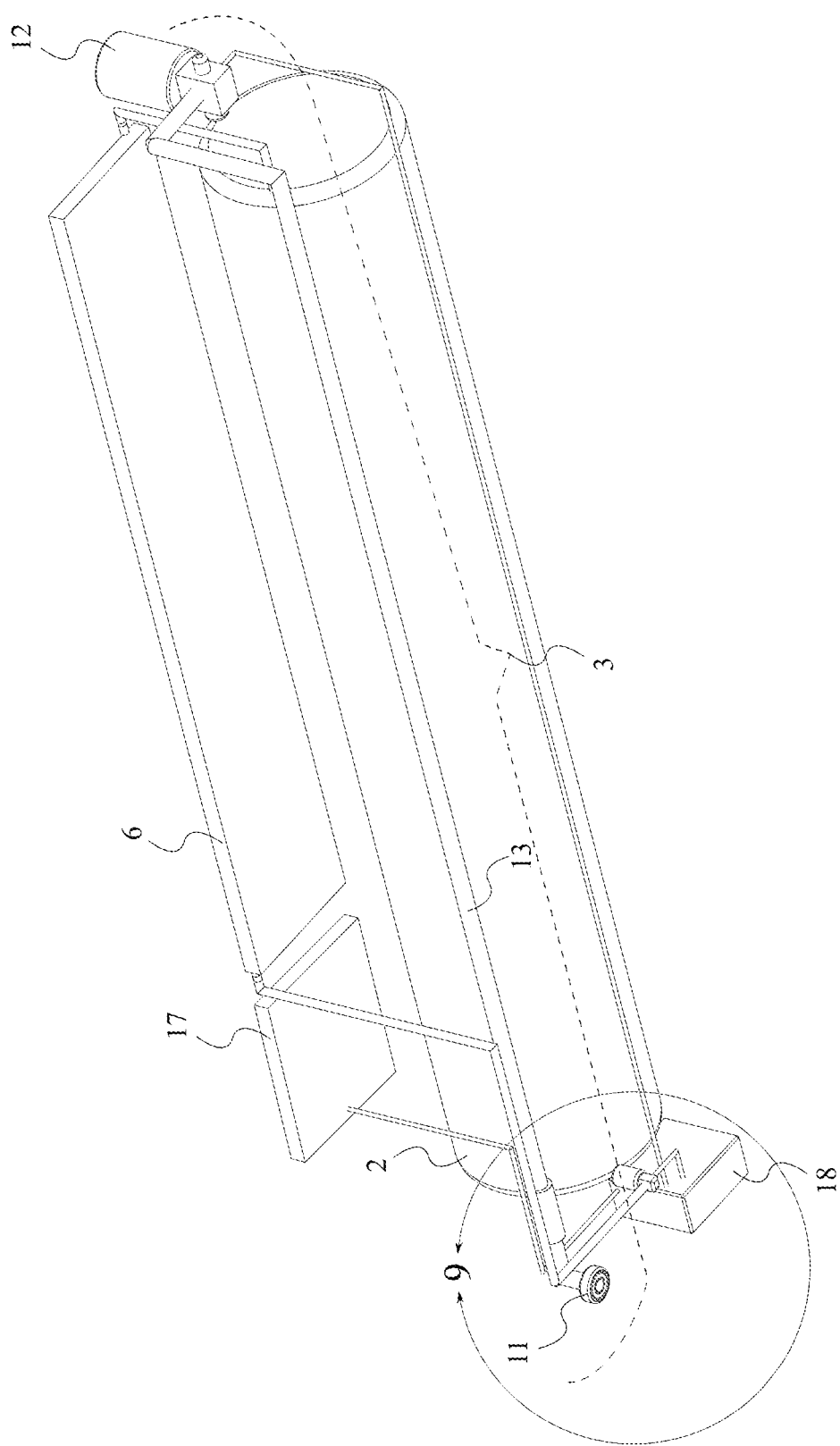
FIG. 8 is a bottom-front-left perspective view of the present invention, without the outer casing.
Figure 9:
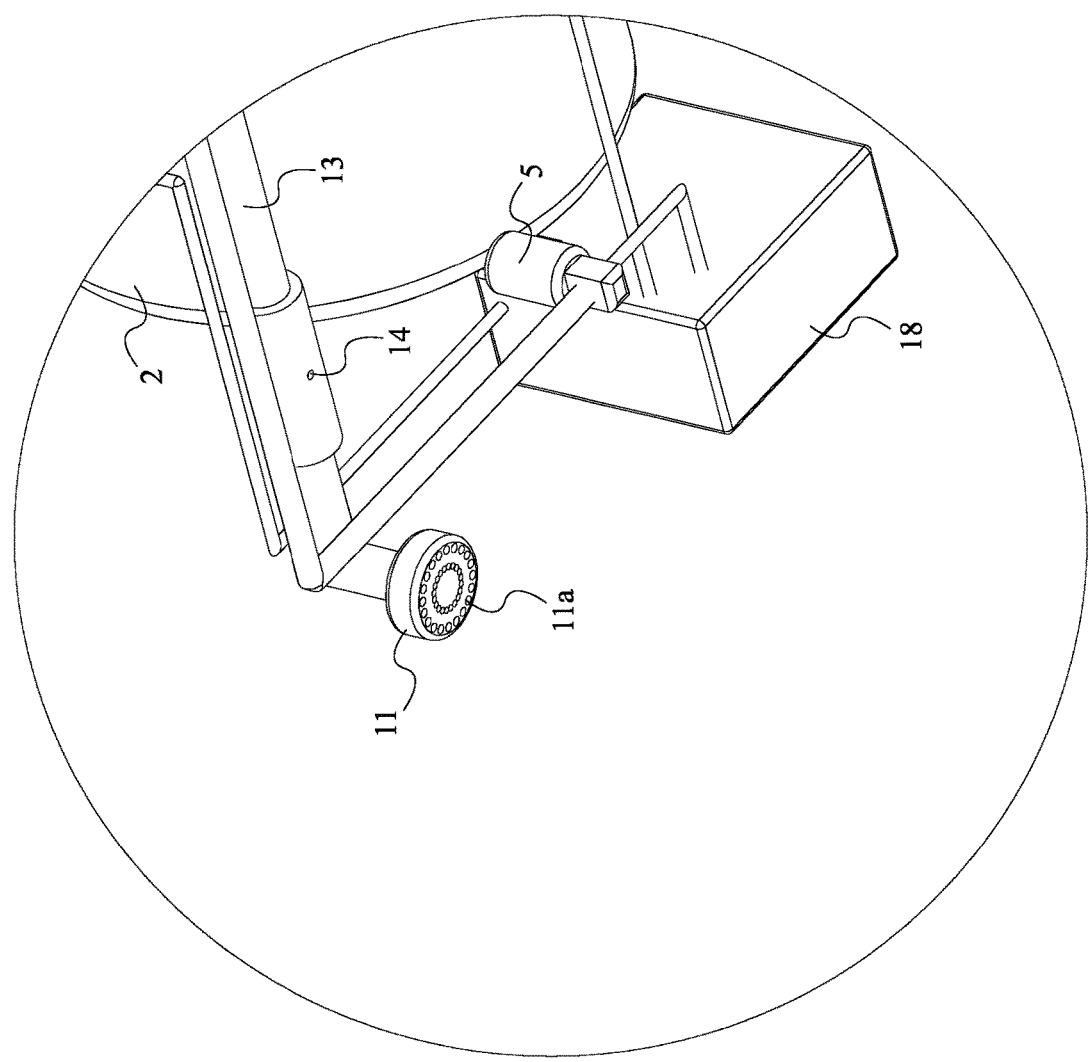
FIG. 9 is a detailed view of section 9 of FIG. 8.
Figure 11:
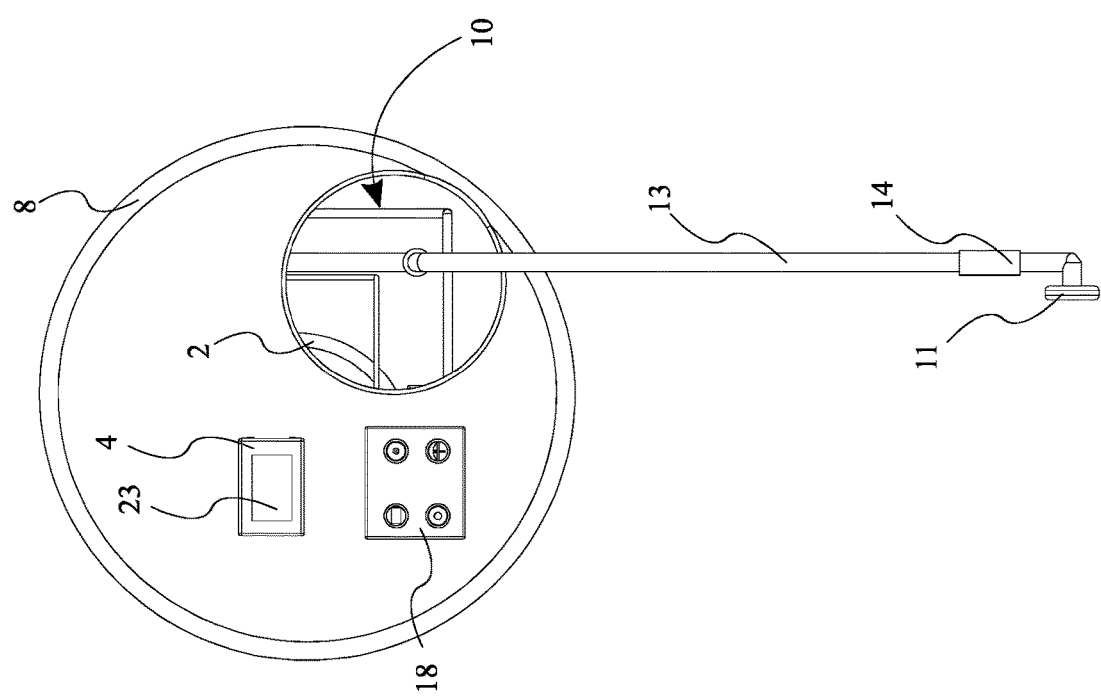
FIG. 11 is a left perspective view of the present invention, wherein the shower head is extended out from the outer casing.

It is an aim of the present invention to control the temperature of the water coming through the shower head 11. In order to accomplish that, the thermostat 4 is thermally coupled to the water tank 2. As seen in FIG. 1, FIG. 3, and FIG. 11, the thermostat 4 is laterally integrated onto the outer shell 8. According to the preferred embodiment, the thermostat 4 displays the temperature of the outside atmosphere as well as the temperature of the water inside the water tank 2, with the help of sensors and LED lighting. Accordingly, a user may manually set the temperature preferred for the water in the water tank by adjusting the temperature settings on the thermostat 4. If the temperature of water in the water tank 2 falls below the desired set temperature, and the temperature of the first solar panel 6 is higher than the temperature of the water, the thermostat 4 automatically (or manually—with the press of a button) activate the first pump 5. To that end, the first pump 5 is operably coupled to the thermostat 4, wherein based on the thermal readings of the thermostat 4, the first pump 5 circulates water from the water tank 2 through the water circulating tube 7. In other words, once activated, the first pump 5 will draw water from the water tank 2 and circulates the water through the water circulating tube 7. In the preferred embodiment, the water circulating tube 7 is positioned adjacent to a planar surface 6a of the first solar panel 6. More specifically, the water circulating tube 7 is disposed across the upper planar surface 6a of the first solar panel 6. In order to accomplish the intended water heating mechanism, the planar surface 6a of the first solar panel 6 is oriented toward the first opening 9. This is so that the first solar panel 6 draws heat from the sun, and this heat is transferred to the water circulating tube 7 on the first solar panel's 6 surface. Further, the water circulating tube 7 is connected between the first pump 5 and the water tank 2. As seen in FIG. 4 and FIG. 7, the water circulating tube 7 is arranged in a coiled and compact fashion on the first solar panel 6. This is so that the maximum potential/space of the first solar panel 6 is utilized for heating the water in the water circulating tube 7. In the preferred embodiment, the first pump 5 stops working automatically, when the water in the water tank 2 reaches the desired temperature, thereby preventing overheating. Further, the first pump 5 and the circulation of water makes sure that the water is heated uniformly within the water tank 2. The first solar panel 6, the water circulating tube 7, and the first water pump 5, may comprise any size, shape, material, brand, or kind that are known to one of ordinary skill in the art, as long as the intended purpose of the present invention is not hindered.

Figure 10:
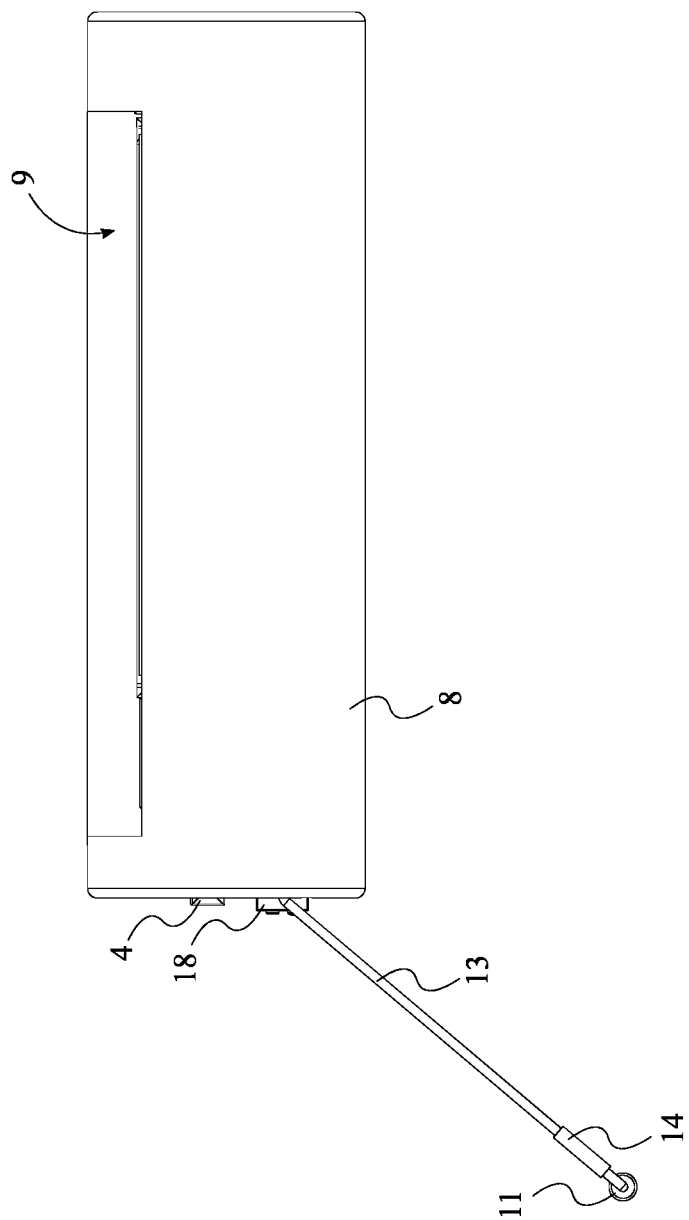
FIG. 10 is a front view the present invention, wherein the shower is extended out of the outer casing.
Figure 12:
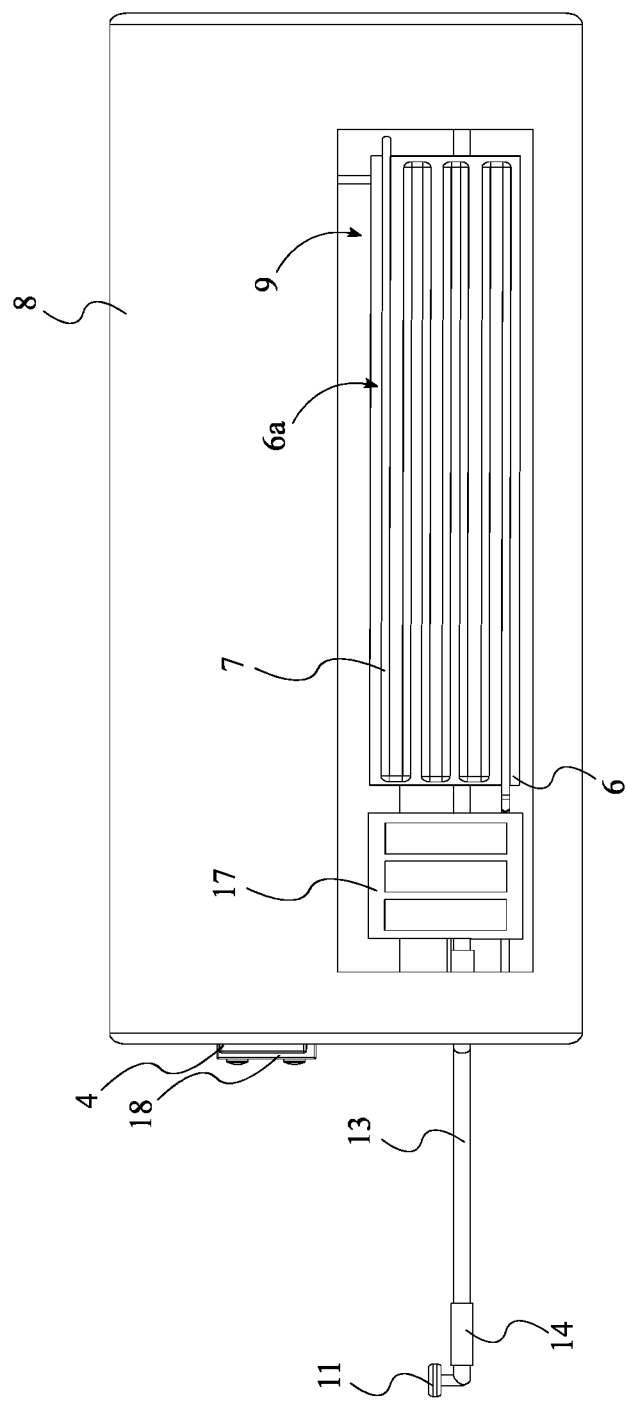
FIG. 12 is a top view of the present invention, with the shower head extending out from the outer casing.

According to the preferred embodiment, the shower pipe 13 is extendible and retractable. This arrangement enables users to pull out the shower head 11 through the second opening 10 when needed, and the shower pipe 13 will retract back into the enclosure 1, when not in use. Further, the shower pipe 13 enables swiveling action for the shower head 11. As seen in FIG. 10 through FIG. 12, the extendable shower pipe 13 and the swivel action allow users to shower hands free with the shower system 3 mounted parallel or horizontal to the vehicle.

In the preferred embodiment, the water tank 2 comprises a fill hole 15 with a resealable cap 16, wherein the fill hole 15 is used for filling water in the water tank 2. Accordingly, the fill hole 15 traverses into the water tank 2, and the resealable cap 16 is engaged with the fill hole 15. Preferably, the resealable cap 16 is accessible through the first opening 9, such that the user may open the resealable cap 16, fill the water tank 2 with water, and close the resealable cap 16 through the first opening 9. The fill hole 15 and the resealable cap 16 may comprise any shape, size, fastening mechanism, components etc. that are known to one of ordinary skill in the art, as long as the intents of the present invention are not hindered.

Continuing with the preferred embodiment of the present invention, the portable solar shower comprises at least one second solar panel 17 and a power unit 18. As seen in FIG. 1, FIG. 3, FIG. 5, and FIG. 11, the at least one second solar panel 17 is mounted within the outer shell 8, and the power unit 18 is laterally integrated onto the outer shell 8. Further, the power unit 18 provides power to all the electrical components of the present invention. In other words, the power unit 18 is electrically connected to the thermostat 4, the first pump 5, the second pump 12, and the at least one second solar panel 7. Preferably, the power unit 18 is a 12V rechargeable battery. However, any other powering system that is known to one of ordinary skill in the art may be used for the smooth functioning of the portable solar shower. In the preferred embodiment, the at least one second solar panel 17 converts solar energy to electrical energy and provides power to the power unit 18. To that end, the at least one second solar panel 17 is mounted within the outer shell, and the at least one second solar panel 17 is in optical communication with the first opening 9. In other words, the at least one second solar panel 17 is oriented toward the first opening 9 and this arrangement enables the second solar panel 17 to receive enough sunlight, thereby enabling the at least one second solar panel 17 to generate the necessary power. Preferably, the at least one second solar panel 17 is smaller than the at least one first solar panel 6 and provides energy sufficient to power a 12V power unit. However, the at least one second solar panel 17 may comprise any brand, size or version, that is known to one of ordinary skill in the art. Furthermore, the power unit 18 and the thermostat 4 are located towards one end of the portable solar shower and they protrude outside of the outer shell 8, such that the user may manually operate the power unit 18 and the thermostat 4 for various purposes.

Figure 5:
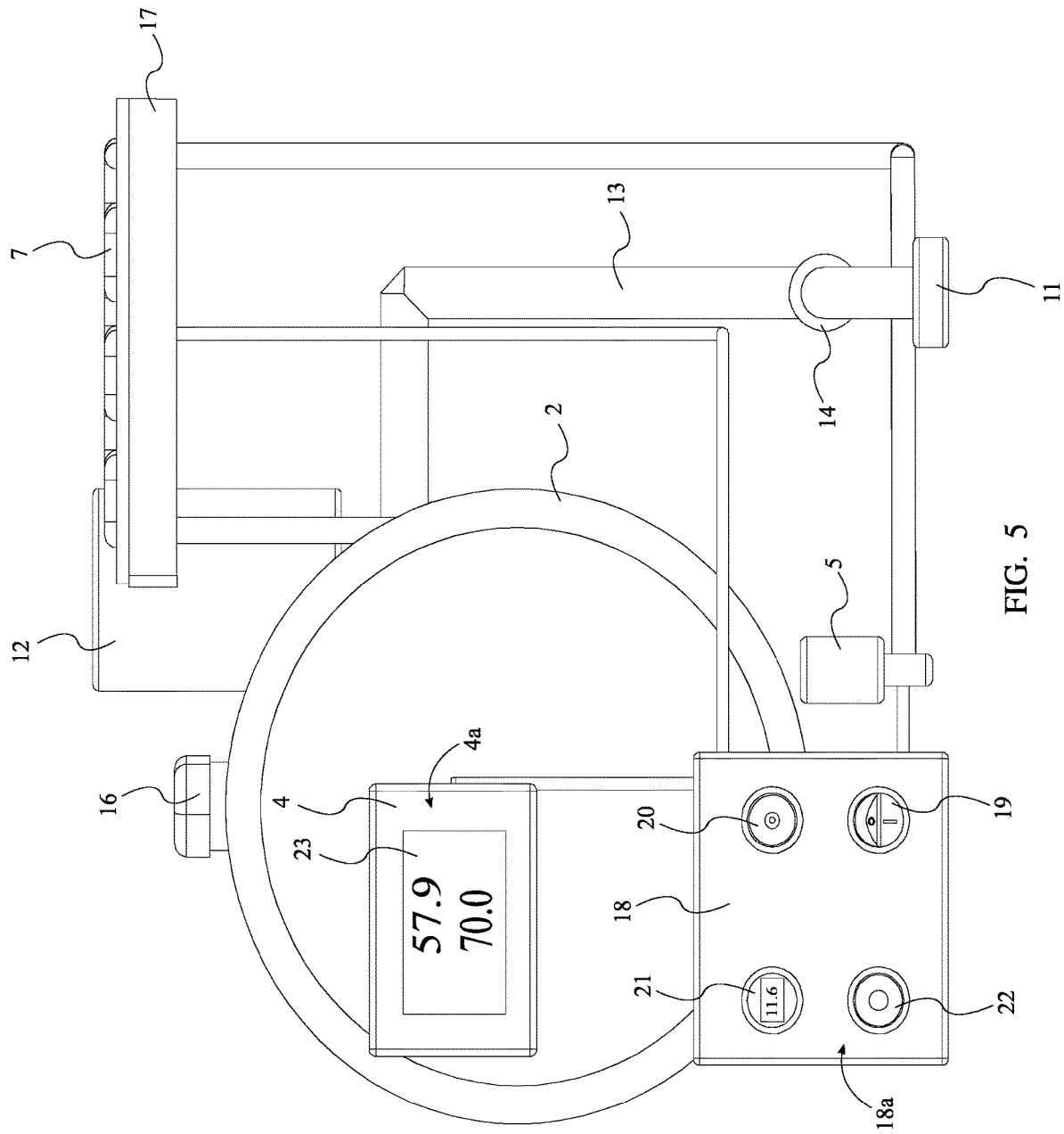
FIG. 5 is a left perspective view of the present invention, without the outer casing.
Figure 6:
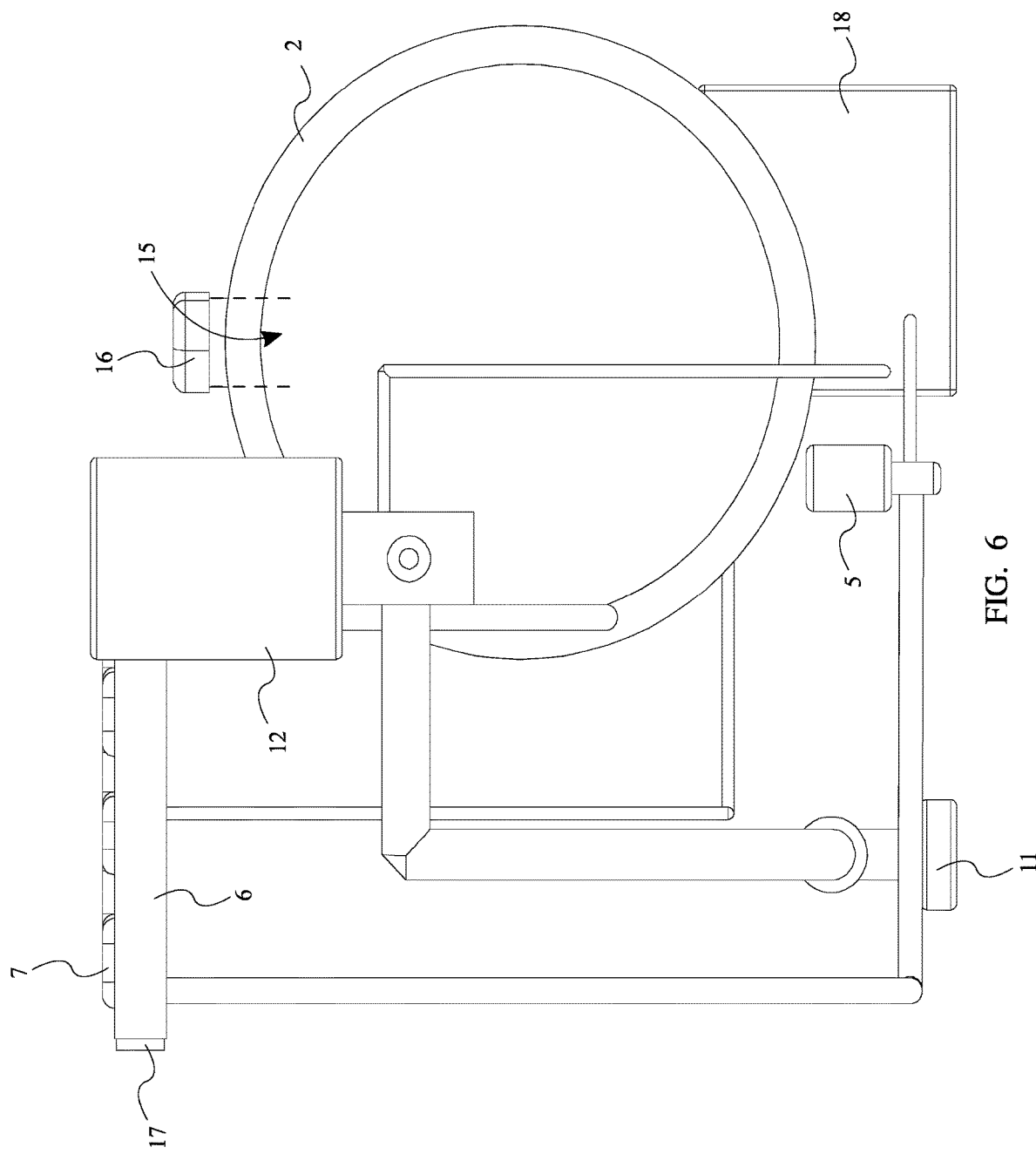
FIG. 6 is a right perspective view of the present invention, without the outer casing.

In the preferred embodiment, the power unit 18 comprises an actuation button 19, a charging port 20, a power display 21, and a charge indicator 22. As seen in FIG. 3 and FIG. 5, the actuation button 19, the charging port 20, the power display 21 and the charge indicator 22 are integrated onto an interfacing surface 18a of the power unit 18. Preferably, the power display 21 and charge indicator 22 are LED displays that depict the voltage of the power unit 18 and the charge status of the power unit 18 respectively. Further, the actuation button 19 comprises at least one on/off power button that can manually operate the first water pump 5. Furthermore, the charging port 20 may be an access port to which an external power supply may be connected to, so as to provide power to the power unit 18. However, the power unit 18 may comprise any other components and/or arrangement of components that are known to one of ordinary skill in the art, as long as the objectives of the present invention are fulfilled.

It is an objective of the present invention to control the temperature of the water in the water tank 2. To accomplish this, the present invention comprises a display unit 23, wherein the display unit 23 is integrated onto an exposed surface 4a of the thermostat 4. Preferably, the display unit 23 displays the temperature of the outside atmosphere and the temperature of water inside the water tank 2. This enables the user to decide on whether to manually turn on the first pump 5 and increase the temperature of the water in the water tank 2. Further, the water tank 2 is also insulated, which helps maintain the temperature of the water at the user defined temperature for long hours. Accordingly, in order to further help maintain the temperature of the water and absorb more heat from the at least one first solar panel 6, the water circulating tube 7 is made black in color.

As seen in FIG. 1, FIG. 11 and FIG. 12, the first opening 9 is rectangular in shape and the second opening 10 is circular in shape. However, the first opening 9 and the second opening 10 may comprise any other size, shape, position, and orientation, as long as the objectives of the present invention are not hindered. Further, as seen in FIG. 1, the outer shell 8 is cylindrical in shape. However, the outer shell 8 may comprise any other material, size and shape, components and arrangement of components that are known to one of ordinary skill in the art, as long as the objectives of the present invention are fulfilled. In the preferred embodiment, the present invention comprises baffles situated at multiple places within, to prevent water from sloshing. Furthermore, the present invention comprises multiple electrical and non-electrical connections between the various components of the present invention, that are needed for the smooth functioning of the device. It should also be noted that, any other similar internal components that are known to one of ordinary skill in the art, and that may be integrated into for the smooth operation of the portable solar shower, will fall under the scope of the present invention.

In an alternate embodiment of the present invention, the outer shell 8 may comprise additional railings to attach accessories or light luggage over the upper surface of the vehicle.

Although the invention has been explained in relation to its preferred embodiment, it is to be understood that many other possible modifications and variations can be made without departing from the spirit and scope of the invention as hereinafter claimed.

What is claimed is:

1. A portable solar powered shower system comprising:
   an enclosure;
   a water tank;
   a shower system; a thermostat;
   a first pump;
   at least one first solar panel;
   a water circulating tube;
   the enclosure comprising an outer shell, a first opening and a second opening;
   the shower system comprising a shower head, a second pump and a shower pipe:
      the water tank, the shower system, the first pump and the at least one first solar panel being mounted within the enclosure;
   the first opening normally traversing into the outer shell;
   the second opening laterally traversing into the outer shell; the thermostat being thermally coupled to the water tank;
   the thermostat being laterally integrated onto the outer shell;
   the water circulating tube being positioned adjacent to a planar surface of the at least one first solar panel;
   the water circulating tube being connected between the first pump and the water tank;
      the planar surface of the at least one first solar panel being oriented toward the first opening;
   the second pump being operably coupled to the water tank, wherein the second pump induces a pressure differential that draws water from the water tank into the shower head; and
   the shower head being accessible through the second opening.

2. The shower system of claim 1, comprising:
   the first pump being operably coupled to the thermostat, wherein based on the thermal readings of the thermostat, the first pump circulates water from the water tank through the water circulating tube.

3. The shower system of claim 1, wherein the shower pipe being extendible and retractable.

4. The shower system of claim 1, comprising:
   a fill hole and a resealable cap;
   the fill hole traversing into the water tank; and
   the resealable cap being engaged with the fill hole.

5. The shower system of claim 4, wherein the resealable cap being accessible through the first opening.

6. The shower system of claim 1, comprising: at least one second solar panel;
   a power unit;
   the at least one second solar panel being mounted within the outer shell; the at least one second solar panel being in optical communication with the first opening; and
   the power unit being electrically connected to the thermostat, the first pump, the second pump, and the at least one second solar panel.

7. The shower system of claim 6, comprising:
   The at least one second solar panel being mounted within the outer shell; and the power unit being laterally integrated onto the outer shell.

8. The shower system of claim 6, wherein the power unit comprising; an actuation button;
   a charging port;
   a power display; and
   a charge indicator;
   the actuation button, the charging port, the power display and the charge indicator being integrated onto an interfacing surface of the power unit.

9. The shower system of claim 6, wherein the at least one second solar panel being oriented toward the first opening.

10. The shower system of claim 6, wherein the at least one second solar panel is smaller than the at least one first solar panel.

11. The shower system of claim 1, comprising:
a display unit; and
the display unit being integrated onto an exposed surface of the thermostat.

12. The shower system of claim 11, wherein the display unit displays the temperature of the outside atmosphere and the temperature of water inside the water tank.

13. The shower system of claim 1, wherein the water tank being insulated.

14. The shower system of claim 1, wherein the water circulating tube being black in color.

15. The shower system of claim 1, wherein the first opening being rectangular.

16. The shower system of claim 1, wherein the second opening being circular.

17. The shower system of claim 1, wherein the outer shell being cylindrical.

* * * * *